United States Patent
Byeon et al.

(10) Patent No.: US 12,477,105 B2
(45) Date of Patent: Nov. 18, 2025

(54) BLOCK SPLITTING STRUCTURE FOR EFFICIENT PREDICTION AND TRANSFORM, AND METHOD AND APPARATUS FOR VIDEO ENCODING AND DECODING USING THE SAME

(71) Applicants: HYUNDAI MOTOR COMPANY, Seoul (KR); KIA CORPORATION, Seoul (KR); KWANGWOON UNIVERSITY INDUSTRY-ACADEMIC COLLABORATION FOUNDATION, Seoul (KR)

(72) Inventors: Joo Hyung Byeon, Seoul (KR); Sea Nae Park, Seoul (KR); Dong Gyu Sim, Seoul (KR); Seung Wook Park, Yongin-si (KR)

(73) Assignees: HYUNDAI MOTOR COMPANY, Seoul (KR); KIA CORPORATION, Seoul (KR); KWANGWOON UNIVERSITY INDUSTRY-ACADEMIC COLLABORATION FOUNDATION, Seoul (KR)

( * ) Notice: Subject to any disclaimer, the term of this patent is extended or adjusted under 35 U.S.C. 154(b) by 246 days.

(21) Appl. No.: 18/038,379

(22) PCT Filed: Nov. 24, 2021

(86) PCT No.: PCT/KR2021/017334
§ 371 (c)(1),
(2) Date: May 23, 2023

(87) PCT Pub. No.: WO2022/114752
PCT Pub. Date: Jun. 2, 2022

(65) Prior Publication Data
US 2024/0007623 A1    Jan. 4, 2024

(30) Foreign Application Priority Data

Nov. 24, 2020  (KR) .......................... 10-2020-0158996
Nov. 23, 2021  (KR) .......................... 10-2021-0162262

(51) Int. Cl.
*H04N 19/119*  (2014.01)
*H04N 19/132*  (2014.01)
*H04N 19/159*  (2014.01)
*H04N 19/176*  (2014.01)

(52) U.S. Cl.
CPC ......... *H04N 19/119* (2014.11); *H04N 19/132* (2014.11); *H04N 19/159* (2014.11); *H04N 19/176* (2014.11)

(58) Field of Classification Search
CPC .. H04N 19/176; H04N 19/119; H04N 19/132; H04N 19/159
See application file for complete search history.

(56) References Cited

U.S. PATENT DOCUMENTS 8,619,856 B2    12/2013  Chen et al.
9,420,293 B2    8/2016   Song et al.
(Continued)

FOREIGN PATENT DOCUMENTS

KR    20130054461 A     5/2013
KR    101379188 B1      4/2014
(Continued)

OTHER PUBLICATIONS

International Search Report cited in corresponding international app No. PCT/KR2021/017334; Feb. 23, 2022; 4 pp.

*Primary Examiner* — On S Mung
(74) *Attorney, Agent, or Firm* — Lempia Summerfield Katz LLC

(57) ABSTRACT

A block splitting structure is disclosed for efficient prediction and transform, and a method and an apparatus are disclosed for video encoding and decoding using the block
(Continued)

Splitting structure. In particular, the method and apparatus are capable of splitting a video data block into two regions or blocks including an L-shaped block and a rectangular block and thus efficiently perform prediction on each block.

21 Claims, 16 Drawing Sheets

(56) References Cited

U.S. PATENT DOCUMENTS

| | | |
|---|---|---|
| 9,549,181 B2 | 1/2017 | Lin |
| 10,091,523 B2 | 10/2018 | Lin |
| 10,511,854 B2 | 12/2019 | Lin |
| 10,951,884 B2 | 3/2021 | Moon et al. |
| 2010/0086030 A1 | 4/2010 | Chen et al. |
| 2013/0064292 A1 | 3/2013 | Song et al. |
| 2014/0301471 A1 | 10/2014 | Lin |
| 2017/0054997 A1 | 2/2017 | Lin |
| 2018/0343467 A1 | 11/2018 | Lin |
| 2019/0373252 A1 | 12/2019 | Moon et al. |
| 2020/0029077 A1 | 1/2020 | Lee et al. |
| 2022/0109863 A1* | 4/2022 | Zhao ............... H04N 19/61 |

FOREIGN PATENT DOCUMENTS

| | | |
|---|---|---|
| KR | 20180084662 A | 7/2018 |
| KR | 20180107762 A | 10/2018 |
| KR | 101970216 B1 | 4/2019 |

* cited by examiner

SPLIT_RIGHT_DOWN

SPLIT_LEFT_UP

SPLIT_RIGHT_DOWN

- - -▶ : Copy (a) PUs (b) TU (c) TUs (d) TUs (e) TUs (a) PUs (b) TU (c) TUs (d) TUs (e) TUs (a) PUs (b) TU (c) TUs (d) TUs (e) TUs (a) PUs (b) TU (c) TUs (d) TUs (e) TUs

BLOCK SPLITTING STRUCTURE FOR EFFICIENT PREDICTION AND TRANSFORM, AND METHOD AND APPARATUS FOR VIDEO ENCODING AND DECODING USING THE SAME

CROSS-REFERENCE TO RELATED APPLICATIONS

This application is a U.S. national stage of International Application No. PCT/KR2021/017334, filed on Nov. 24, 2021, which claims priority to Korean Patent Application No. 10-2020-0158996, filed on Nov. 24, 2020, and Korean Patent Application No. 10-2021-0162262, filed on Nov. 23, 2021, the entire contents of which are incorporated herein by reference.

TECHNICAL FIELD

The present disclosure relates to the encoding and decoding of video data. More particularly, the present disclosure relates to a method for splitting a coding block of video data into two regions or blocks including an L-shaped block and a rectangular block and for efficiently predicting each region.

BACKGROUND

The statements in this section merely provide background information related to the present disclosure and do not necessarily constitute prior art.

Since video data has a large amount of data compared to audio or still image data, the video data requires a lot of hardware resources, including memory, to store or transmit the video data without processing for compression.

Accordingly, an encoder is generally used to compress and store or transmit video data. A decoder receives the compressed video data, decompresses the received compressed video data, and plays the decompressed video data. Video compression techniques include H.264/ARC, High Efficiency Video Coding (HEVC), and Versatile Video Coding (VVC), which has improved coding efficiency by about 30% or more compared to HEVC.

However, since the image size, resolution, and frame rate of video data gradually increase, the amount of data to be encoded also increases. Accordingly, a new compression technique providing higher encoding efficiency and an improved image enhancement effect than existing compression techniques is required.

SUMMARY

An aspect of the present disclosure is to provide a method and an apparatus for video encoding and decoding, which can split a coding block of video data into two regions or blocks including an L-shaped block and a rectangular block. It efficiently performs prediction for each of these regions and blocks.

Another aspect of the present disclosure provides a method for encoding a block of video data. The method comprises determining that a block of video data is split into an L-shaped block and a rectangular block. The method further comprises determining a splitting type depending on a relative position of the rectangular block within the block of video data. The method further comprises determining a pair of prediction techniques to be applied to the L-shaped block and the rectangular block based on the splitting type. The pair of prediction techniques include a first prediction technique for the L-shaped block and a second prediction technique for the rectangular block. The method further comprises generating first predicted values for samples within the L-shaped block by applying the first prediction technique to the L-shaped block. The method further comprises generating second predicted values for samples within the rectangular block by applying the second prediction technique to the rectangular block.

Another aspect of the present disclosure provides a method for decoding a block of video data. The method comprises determining that a block of video data is split into an L-shaped block and a rectangular block. The method further comprises determining a splitting type depending on a relative position of the rectangular block within the block of video data. The method further comprises determining a pair of prediction techniques to be applied to the L-shaped block and the rectangular block based on the splitting type. The pair of prediction techniques include a first prediction technique for the L-shaped block and a second prediction technique for the rectangular block. The method further comprises generating first predicted values for samples within the L-shaped block by applying the first prediction technique to the L-shaped block. The method further comprises generating second predicted values for samples within the rectangular block by applying the second prediction technique to the rectangular block.

An aspect of the disclosure provides a video encoding apparatus that comprises a memory and at least one processor connected thereto to perform each step of the method for encoding a block of video data. An aspect of the disclosure provides a video decoding apparatus that comprises a memory and at least one processor connected thereto to perform each step of the method of decoding a block of video data.

An aspect of the present disclosure provides a computer-readable recording medium in which instructions are recorded. When the instructions are performed by a processor of a video encoding apparatus, the instructions cause the video encoding apparatus to perform each step of the method of encoding a block of video data. An aspect of the present disclosure provides a computer-readable recording medium in which instructions are recorded. When the instructions are performed by a processor of the video decoding apparatus, the instructions cause the video decoding apparatus to perform each step of the method of decoding a block of video data.

DETAILED DESCRIPTION

Figure 1:
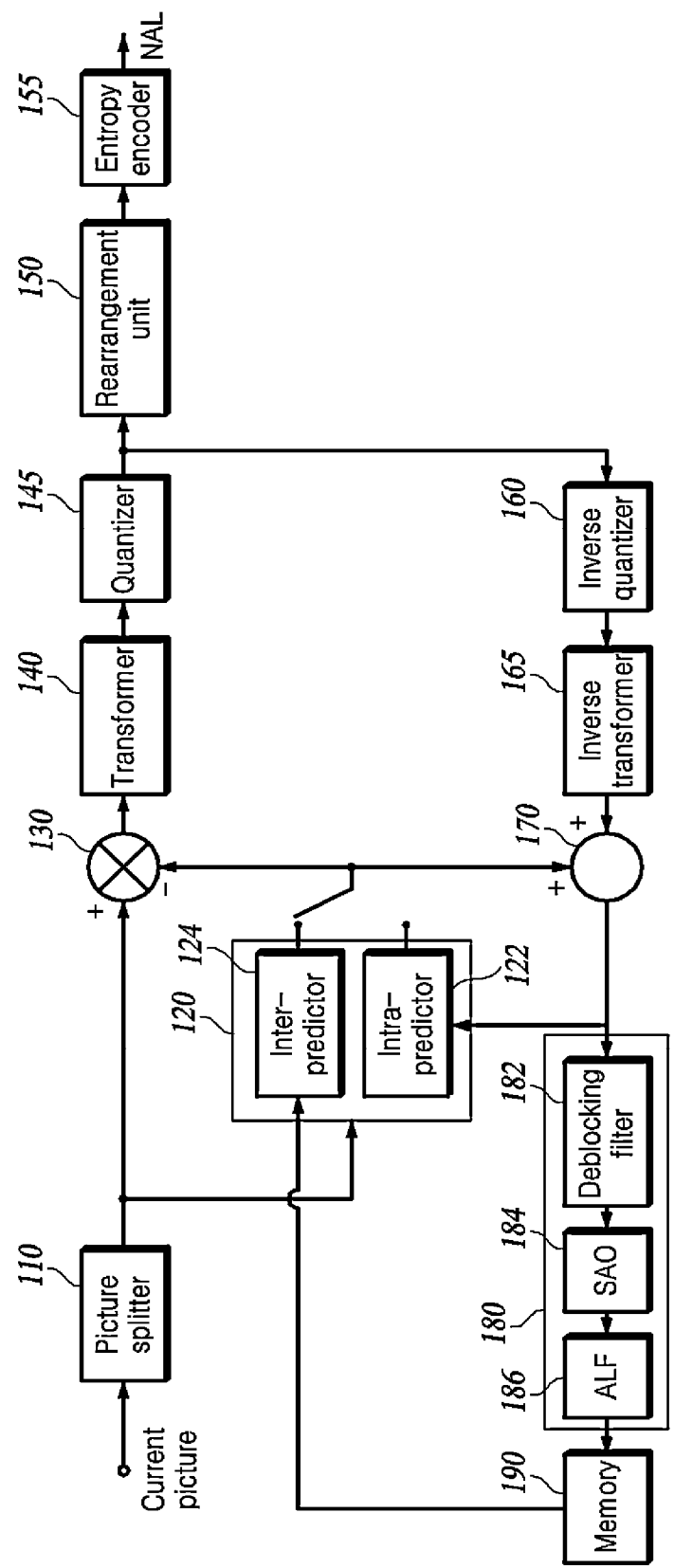
FIG. 1 is a block diagram of a video encoding apparatus capable of implementing the techniques of the present disclosure.

Hereinafter, some embodiments of the present disclosure are described in detail with reference to the accompanying illustrative drawings. In the following description, like reference numerals designate like elements, although the elements are shown in different drawings. Further, in the following description of some embodiments, a detailed description of related known components and functions when considered to obscure the subject of the present disclosure has been omitted for the purpose of clarity and for brevity.

FIG. 1 is a block diagram for a video encoding apparatus which may implement technologies of the present disclosure. Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as the software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each CU is encoded as a syntax of the CU and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a CTU. Information on the size of the CTU (CTU size) is encoded as the syntax of the SPS or the PPS and delivered to a video decoding apparatus.

The picture splitter 110 splits each picture constituting the video into a plurality of CTUs having a predetermined size and then recursively splits the CTU by using a tree structure. A leaf node in the tree structure becomes the CU, which is a basic unit of encoding.

The tree structure may be a quadtree (QT) in which a higher node (or a parent node) is split into four lower nodes (or child nodes) having the same size. The tree structure may be a binarytree (BT) in which the higher node is split into two lower nodes. The tree structure may be a ternarytree (TT) in which the higher node is split into three lower nodes at a ratio of 1:2:1. The tree structure may be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. Here, a BTTT is added to the tree structures to be referred to as a multiple-type tree (MTT).

Figure 2:
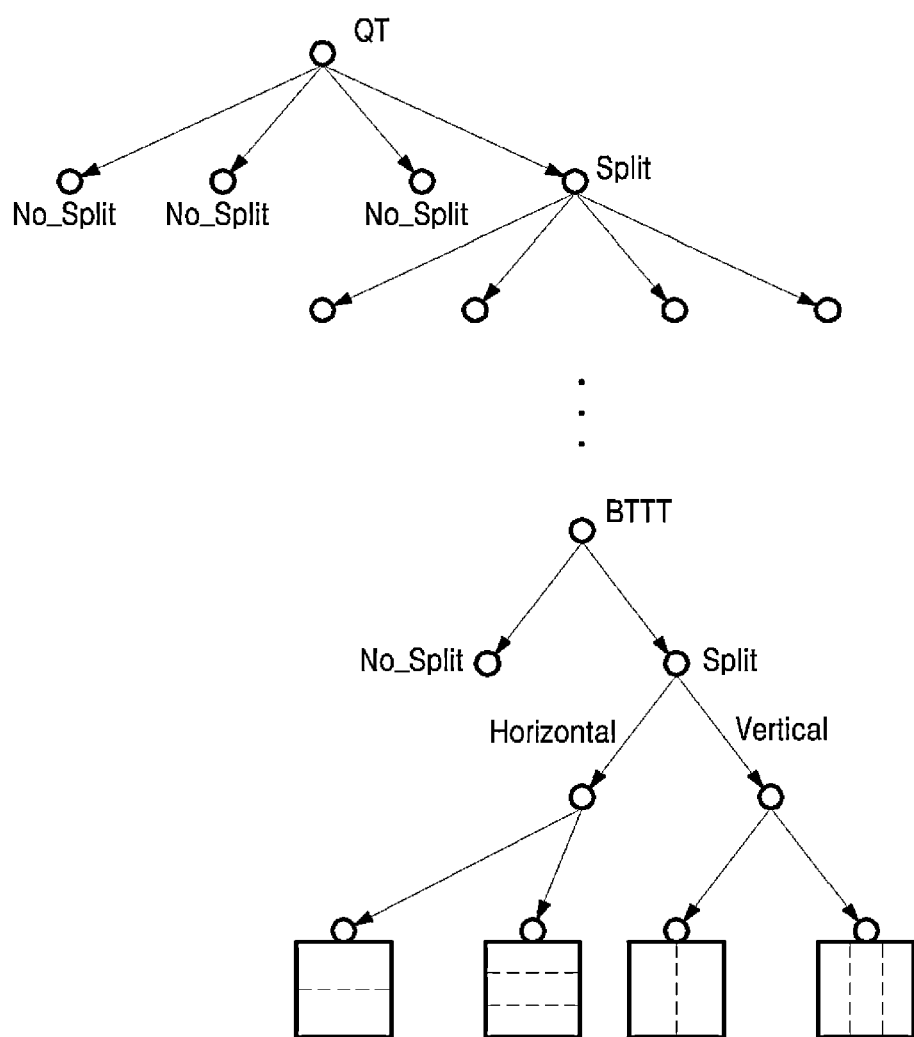
FIG. 2 illustrates block splitting using a QuadTree plus BinaryTree TernaryTree (QTBTTT) structure.

FIG. 2 is a diagram for describing a method for splitting a block by using a QTBTTT structure.

As illustrated in FIG. 2, the CTU may first split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., in a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks of a form of being asymmetrical to each other may be additionally present. The asymmetrical form may include a form in which the block of the corresponding node split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block". As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
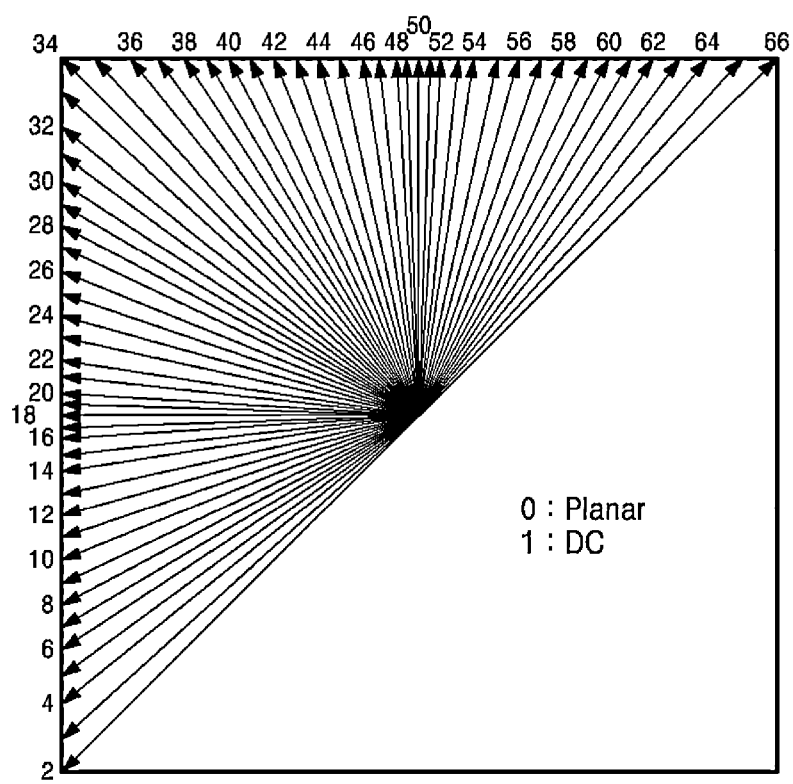
FIG. 3A and FIG. 3B illustrate a plurality of intra-prediction modes including wide-angle intra-prediction modes.

The intra predictor 122 predicts pixels in the current block by using pixels (reference pixels) positioned on a neighboring of the current block in the current picture including the current block. There is a plurality of intra prediction modes according to the prediction direction. For example, as illustrated in FIG. 3A, the plurality of intra prediction modes may include 2 non-directional modes including a planar mode and a DC mode and may include 65 directional modes. A neighboring pixel and an arithmetic equation to be used are defined differently according to each prediction mode.

Figure 3B:
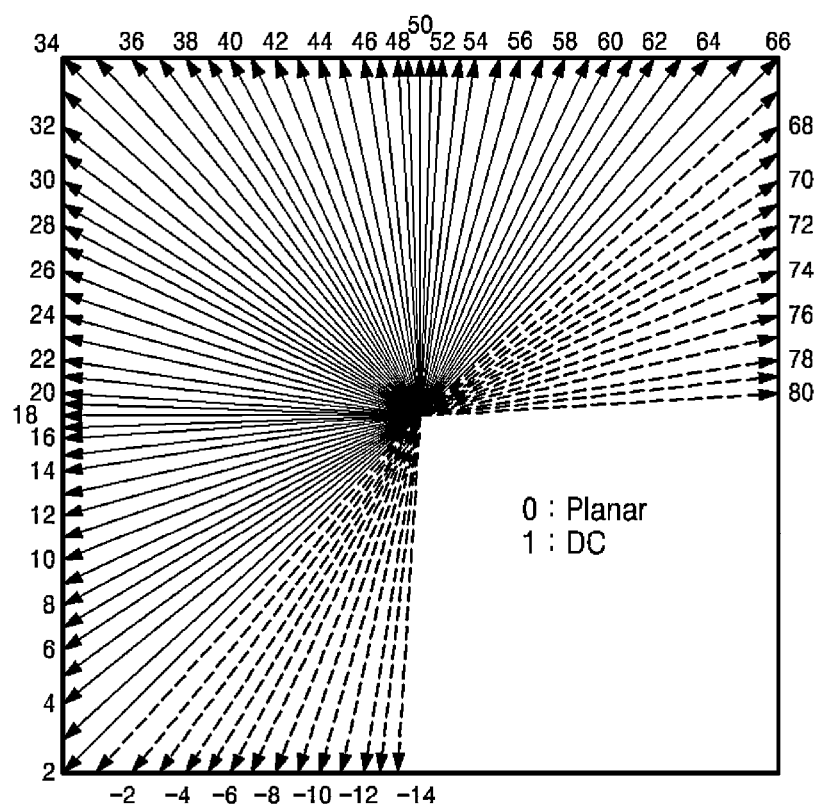

For efficient directional prediction for the current block having the rectangular shape, directional modes (#67 to #80, intra prediction modes #−1 to #−14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and also select an appropriate intra prediction mode to be used from tested modes. For example, the intra predictor 122 may calculate rate-distortion values by using a rate-distortion analysis for multiple tested intra prediction modes and also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current bock in the current picture and the prediction block in the reference picture. In general, motion estimation is performed for a luma component, and a motion vector calculated based on the luma component is used for both the luma component and a chroma component. Motion information including information the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, etc. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of the bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and information on two motion vectors is delivered to the entropy encoder 155. Here, reference picture list 0 may be constituted by pictures before the current picture in a display order among pre-restored pictures, and reference picture list 1 may be constituted by pictures after the current picture in the display order among the pre-restored pictures. However, although not particularly limited thereto, the pre-restored pictures after the current picture in the display order may be additionally included in reference picture list 0. Inversely, the pre-restored pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
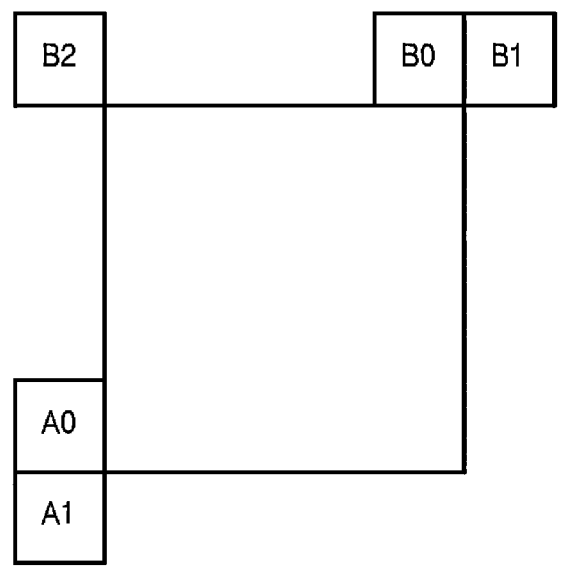
FIG. 4 illustrates neighboring blocks of a current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

The merge skip mode is a special case of the merge mode. After quantization, when all transform coefficients for entropy encoding are close to zero, only the neighboring block selection information is transmitted without transmitting a residual signal. By using the merge skip mode, it is possible to achieve a relatively high encoding efficiency for images with slight motion, still images, screen content images, and the like.

Hereinafter, the merge mode and the merge skip mode are collectively called the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value and average value computation, etc.) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The predictor 120 may further use intra block copy (IBC) prediction. In IBC prediction, the predictor 120 searches a prediction block in the same frame or picture as the block being coded as in intra prediction, but the predictor 120 may usually search for a wider search area as well as neighboring rows and columns of pixels. In IBC prediction, the predictor 120 may determine a block vector (also referred to as a motion vector) to identify a prediction block within the same frame or picture as the block being predicted. The block vector contains an x-component and a y-component. The x-component identifies the horizontal displacement between the video block being predicted and the prediction block, and the y-component identifies the vertical displacement between the video block being predicted and the prediction block. The determined block vector is signaled in the bitstream so that a video decoding apparatus can identify the prediction block selected by the video encoding apparatus.

The subtractor 130 generates a residual block by subtracting the prediction block generated by the intra predictor 122 or the inter predictor 124 from the current block.

The transformer 140 transforms a residual signal in a residual block having pixel values of a spatial domain into a transform coefficient of a frequency domain. The transformer 140 may transform residual signals in the residual block by using a total size of the residual block as a transform unit or also split the residual block into a plurality of sub-blocks and perform the transform by using the sub-block as the transform unit. Alternatively, the residual block is divided into two sub-blocks, which are a transform area and a non-transform area to transform the residual signals by using only the transform area sub-block as the transform unit. Here, the transform area sub-block may be one of two rectangular blocks having a size ratio of 1:1 based on a horizontal axis (or vertical axis). In this case, a flag (cu_sbt_flag) indicates that only the sub-block is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area sub-block may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to transform coefficients quantized arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), Exponential Golomb, etc.

Further, the entropy encoder 155 encodes information such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to restore the residual block.

The adder 170 adds the restored residual block and the prediction block generated by the predictor 120 to restore the current block. Pixels in the restored current block are used as reference pixels when intra-predicting a next-order block.

The loop filter unit 180 performs filtering for the restored pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the restored blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating a difference between the restored pixel and an original pixel, which occurs due to lossy coding. The SAO filter 184 applies an offset as a CTU unit to enhance a subjective image quality and encoding efficiency. Contrary to this, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The restored block filtered through the deblocking filter 182, the SAO filter 184, and the ALF 186 is stored in the memory 190. When all blocks in one picture are restored, the restored picture may be used as a reference picture for inter predicting a block within a picture to be encoded afterwards.

Figure 5:
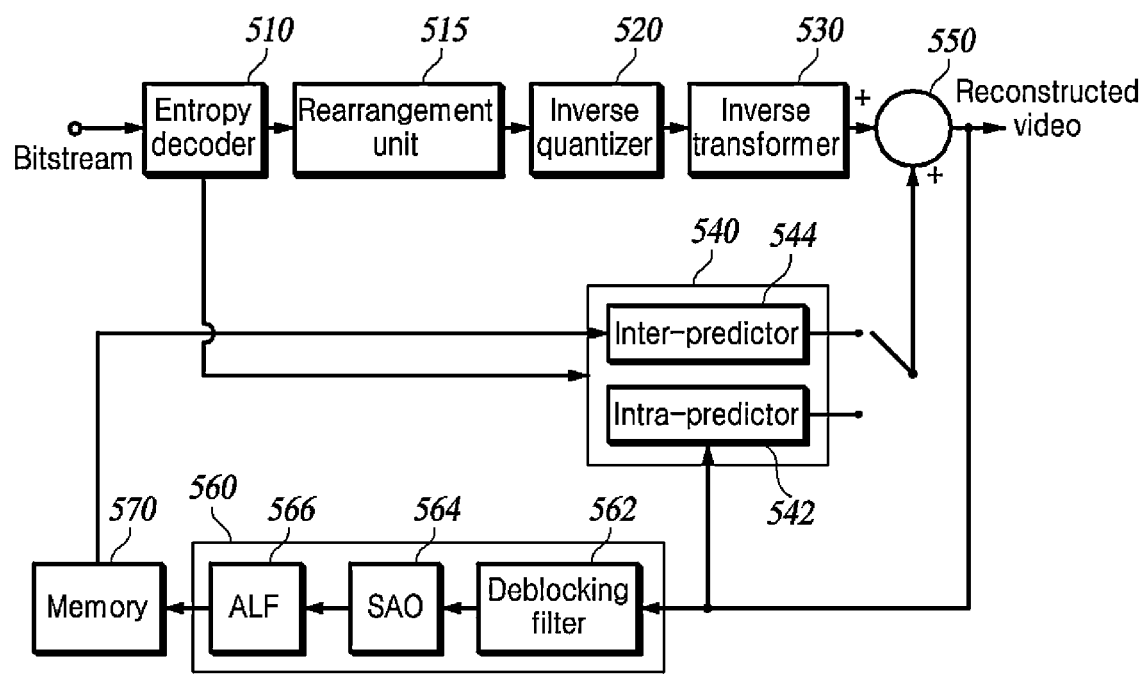
FIG. 5 is a block diagram of a video decoding apparatus capable of implementing the techniques of the present disclosure.

FIG. 5 is a functional block diagram for a video decoding apparatus, which may implement the technologies of the present disclosure. Hereinafter, referring to FIG. 5, the video decoding apparatus and sub-components of the apparatus are described.

The video decoding apparatus may be configured to include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for restoring the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU is extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (MTT_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT being further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by restoring the residual signals by inversely transforming the dequantized transform coefficients into the spatial domain from the frequency domain.

Further, when the inverse transformer 530 inversely transforms a partial area (sub-block) of the transform block, the inverse transformer 530 extracts a flag (cu_sbt_flag) that only the sub-block of the transform block is transformed, directional (vertical/horizontal) information (cu_sbt_horizontal_flag) of the sub-block, and/or positional information (cu_sbt_pos_flag) of the sub-block. The inverse transformer 530 also inversely transforms the transform coefficients of the corresponding sub-block into the spatial domain from the frequency domain to restore the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include the intra predictor 542 and the inter predictor 544. The intra predictor 542 is activated when the prediction type of the current block is the intra prediction and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The predictor 540 may further use an intra block copy (IBC) mode. In the IBC mode, the predictor 540 may use a block vector decoded from the bitstream by the entropy decoder 410 to identify the prediction block selected by a video encoding apparatus.

The adder 550 restores the current block by adding the residual block output from the inverse transform unit and the prediction block output from the inter prediction unit or the intra prediction unit. Pixels within the restored current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the restored blocks in order to remove the blocking artifact, which occurs due to block unit decoding.

The SAO filter 564 and the ALF 566 perform additional filtering for the restored block after the deblocking filtering in order to compensate a difference between the restored pixel and an original pixel, which occurs due to lossy coding. The filter coefficient of the ALF is determined by using information on a filter coefficient decoded from the bitstream.

The restored block filtered through the deblocking filter 562, the SAO filter 564, and the ALF 566 is stored in the memory 570. When all blocks in one picture are restored, the restored picture may be used as a reference picture for inter predicting a block within a picture to be encoded afterwards.

The present disclosure relates to the encoding and decoding of video data. More particularly, the present disclosure relates to splitting a coding block into two regions or (sub)blocks including an L-shaped block and a rectangular block and performing prediction for each (sub)block, for efficient prediction of a coding block of video data. A prediction technique appropriate for each (sub)block may be selected by a video encoder, or a prediction technique for increasing prediction accuracy according to each (sub)block's relative position within a coding block may be predefined.

Figure 6:
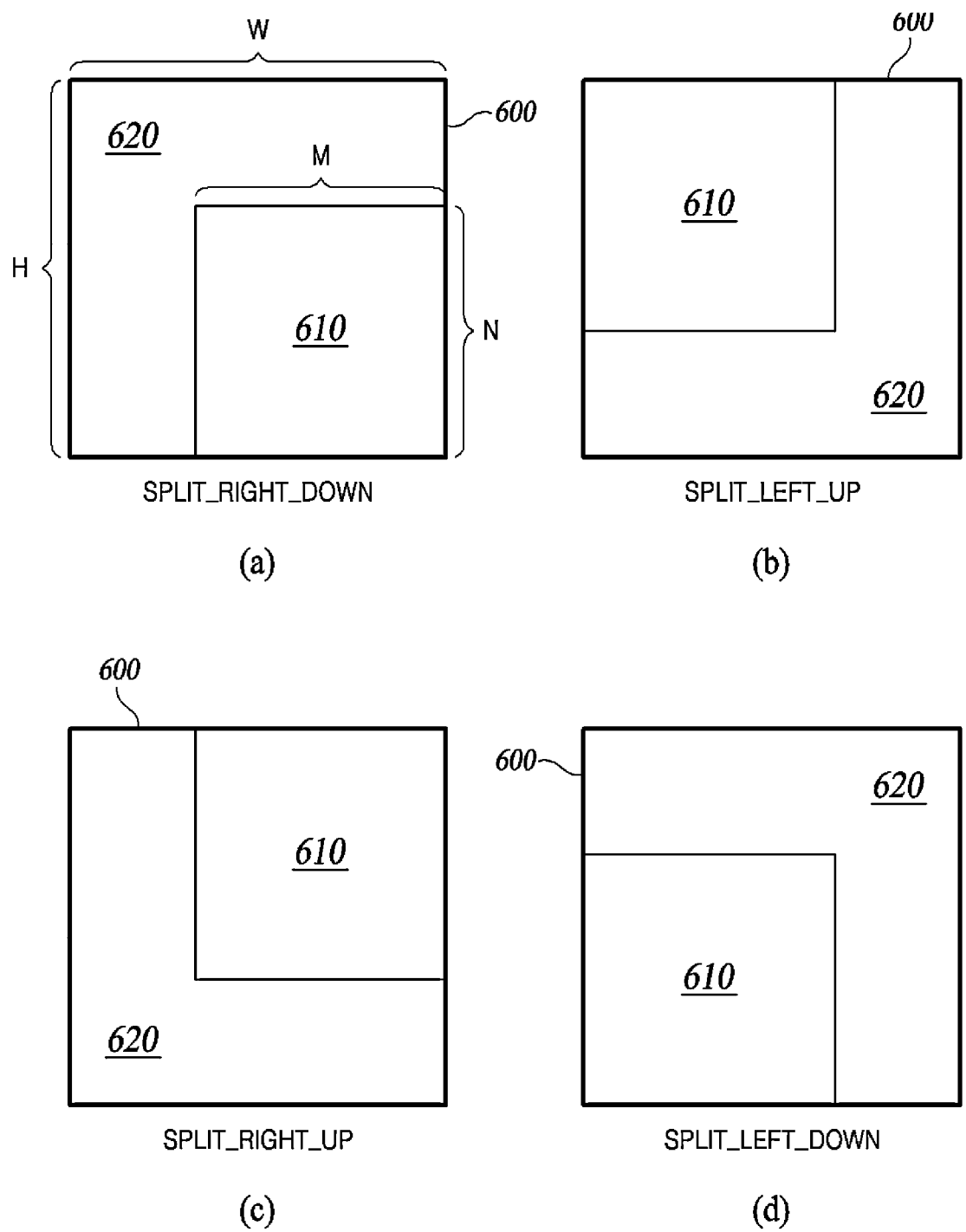
FIG. 6 shows geometric block splits that give a shape other than a rectangle (including a square) to a prediction unit according to an embodiment of the present disclosure.

FIG. 6 shows geometric block splits that give a shape other than a rectangle (including a square) to a prediction unit according to an embodiment of the present disclosure.

A block 600 of video data may be split into a rectangular block 610 adjoining a corner of the block 600 and an L-shaped block 620 defined by the rectangular block 610. For example, the block 600 of video data may correspond to a CTU or a CU, and the rectangular block 610 and the L-shaped block 620 may correspond to a PU.

As shown in (a) through (b) of FIG. 6, the rectangular block 610 may adjoin one of the right bottom, left top, right top, and left bottom corners within the block 600 of video data. In the following description, these splitting types may be referred to as SPLIT_RIGHT_DOWN, SPLIT_LEFT_UP, SPLIT_RIGHT_UP, and SPLIT_LEFT_DOWN, respectively. In an embodiment, SPLIT_RIGHT_DOWN and SPLIT_LEFT_UP among the exemplified four splitting types may be used for blocks of video data. In another embodiment, only SPLIT_RIGHT_DOWN among the exemplified four splitting types may be used for blocks of video data. In yet another embodiment, all of the exemplified four splitting types may be used for blocks of video data.

The size (i.e., width M and height N) of the rectangular block 610 in the block 600 of video data may be determined by the size (i.e., a specific ratio between width W and height H) of the block 600 of video data. Here, the specific ratio may be ¼, ½, or ¾, or may be selected from among them. Alternatively, the size of the rectangular block 610 may be a predefined fixed size.

The video encoder may determine whether to apply such geometric block splitting to a given block 600 of video data. The video encoder may signal a video decoder a 1-bit flag (e.g., new_split_flag) indicating whether such geometric block splitting is applied to the given block 600 and an index indicating one of a plurality of splitting types. The video encoder may determine not to apply geometric block splitting to the block 600 of video data, in which case the block 600 of video data may be predicted as a single prediction unit without being split.

Whether geometric block splitting is applied to the given block 600 or not may be dependent on the size of the given block 600. In an embodiment, the minimum size and/or maximum size of the block 600 that allows for geometric block splitting may be defined. For example, if the width W and height H of the block 600 meets "Wmin<W<Wmax, Hmin<H<Hmax", geometric block splitting may be applied to the block 600. Accordingly, if the size of the given block 600 is smaller than the minimum size or larger than the maximum size, the signaling of the 1-bit flag (e.g., new_split_flag) may be omitted.

In an embodiment, the geometric block splits illustrated in FIG. 6 may be integrated into block partitions for a CTU illustrated in FIG. 2. For example, the geometric splits illustrated in FIG. 6, as well as quadtree (QT) splitting, binary tree (BT) splitting, and ternary tree (TT) splitting, may be used for block partitions for a CTU. In a case where geometric splitting is applied to a block corresponding to a given node and the block is split into an L-shaped block and a rectangular block, which correspond to two child nodes, quadtree (QT) splitting, binary tree (BT) splitting, and ternary tree (TT) splitting may be applied to the rectangular block, but no more splitting may be applied to the L-shaped block. In other words, a child node corresponding to the L-shaped block may be a leaf node in a tree structure.

In a case where a coding block 600 of video data is split into two subblocks 610 and 620 including a rectangular block 610 and an L-shaped block 620, a prediction technique appropriate for each subblock 610 and 620 may be selected by the video encoder, or a prediction technique may be predefined that can improve prediction technique according to each subblock 610 and 620's relative position within the coding block 600.

For example, the video encoder may select one of available prediction techniques (e.g., intra-prediction, inter-prediction, and intra block copy (IBC)) for each subblock 610 and 620 of the given coding block 600. The intra-prediction technique may be applied to both of the two subblocks 610 and 620, or different prediction techniques may be applied to the two subblocks 610 and 620. For example, a pair of prediction techniques selected by the video encoder may be applied to the subblocks 610 and 620 of the given coding block 600. The video encoder may signal the video decoder syntax elements indicating two prediction techniques to be applied to the rectangular block 610 and the L-shaped block 620.

In an embodiment, a pair of prediction techniques to be applied to each splitting type of the geometric block splits illustrated in FIG. 6 may be predefined. Accordingly, when geometric block splitting is applied to the given coding block 600, the signaling of a syntax element indicating two prediction techniques to be applied to the rectangular block 610 and the L-shaped block 620 may not be required.

For example, in the case of SPLIT_RIGHT_DOWN, the video encoder and the video decoder may determine (or infer) that intra-prediction is applied to the L-shaped block 620 and inter-prediction is applied to the rectangular block 610. In the case of SPLIT_LEFT_UP, the video encoder and the video decoder may determine (or infer) that inter-prediction is applied to the L-shaped block 620 and intra-prediction is applied to the rectangular block 610. In the case of SPLIT_RIGHT_UP and SPLIT_LEFT_DOWN, the video encoder and the video decoder may determine (or infer) that intra-prediction is applied to the L-shaped block 620 and inter-prediction is applied to the rectangular block 610.

In a case where geometric block splitting is applied to a coding block 600 within an I-slice of video data, different prediction techniques, intra-prediction and intra block copy, may be applied to the two subblocks 610 and 620. For example, in the case of SPLIT_RIGHT_DOWN, the video encoder and the video decoder may determine (or infer) that intra-prediction is applied to the L-shaped block 620 and intra block copy is applied to the rectangular block 610. Also, in the case of SPLIT_LEFT_UP, the video encoder and the video decoder may determine (or infer) that intra-prediction is applied to the rectangular block 610 and intra block copy is applied to the L-shaped block 620.

In a case where different prediction techniques are applied to the two subblocks 610 and 620 of the coding block 600, prediction may be performed more efficiently when intra-prediction is applied to whichever of the two subblocks 610 and 620 that is positioned closer to reconstructed samples of left and upper blocks contiguous to the coding block 600 (which are used as reference pixels for intra-prediction). Also, prediction may be performed more efficiently when inter-prediction (or intra block copy) rather than intra-prediction is applied to whichever of the two subblocks 610 and 620 that is positioned farther away from the reconstructed samples of the left and upper blocks contiguous to the coding block 600 (which are used as reference pixels for intra-prediction). In this way, by geometrically splitting a given coding block into a region appropriate for intra-prediction and a region inappropriate for intra-prediction and applying inter-prediction (or intra block copy) to the region inappropriate for intra-prediction, the prediction accuracy for the coding block 600 may be improved, and the amount of residual signals may be reduced. Thus, overall encoding efficiency may be enhanced.

Within the coding block 600 of video data, the rectangular block 610 and the L-shaped block 620 may be sequentially encoded and decoded in a predefined order. In other words, the video decoder may decode either the rectangular block 610 or the L-shaped block 620 and then start encoding the other one.

In an embodiment, in a case where a coding block 600 of video data is split into two blocks including a rectangular block 610 and an L-shaped block 620, intra-prediction may be applied to the rectangular block 610 and the L-shaped block 620 each. Also, before performing intra-prediction for either the rectangular block 610 or the L-shaped block 620, the other block (e.g., a block including a [0,0] sample of the coding block 600) may have been already reconstructed.

Figure 7A:
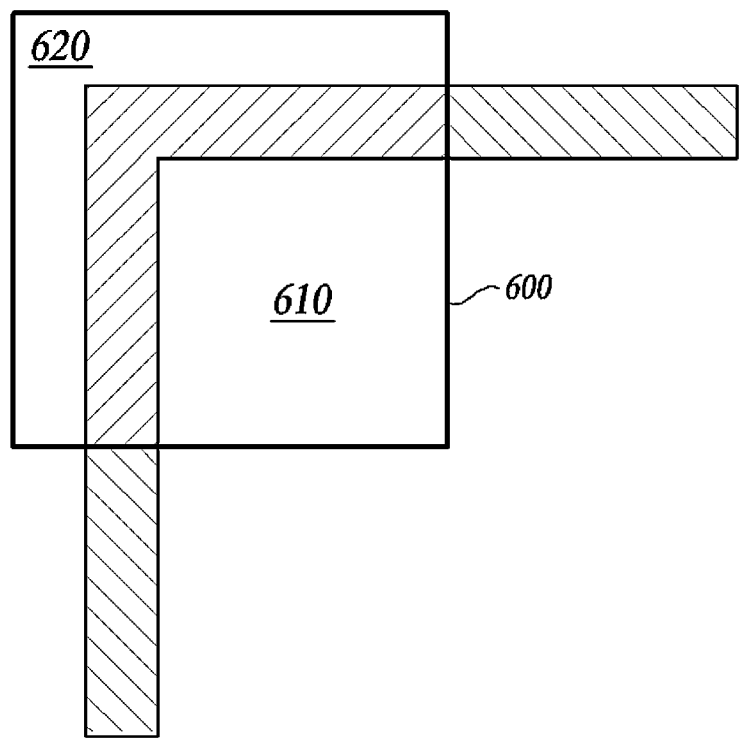
FIG. 7A shows reference samples available for intra-prediction of a rectangular block in SPLIT_RIGHT_DOWN according to an embodiment of the present disclosure.

In the case of SPLIT_RIGHT_DOWN, for example, the L-shaped block 620 at the top and left sides may have been already reconstructed before the rectangular block 610 within the coding block 600 is predicted. In other words, when performing intra-prediction for the rectangular block 610 within the coding block 600, reconstructed samples of the L-shaped block 620 within the coding block 600 may be used. Accordingly, the L-shaped block 620 may be intra-predicted from reference samples contiguous to the coding block 600, and the rectangular block 610 may be intra-predicted from reconstructed samples of the L-shaped block 620. FIG. 7A shows reference samples available for intra-prediction of the rectangular block 610 in SPLIT_RIGHT_DOWN. Among the reference samples indicated in FIG. 7A, the values of left reference samples positioned under the coding block 600 are copied from a reconstructed value of a lower boundary sample(s) of the L-shaped block 620, and the values of upper reference samples positioned to the right of the coding block 600 are copied from a reconstructed value of a right boundary sample(s). The left reference samples may be samples that are positioned in one or a plurality of columns, and the right reference samples may be samples that are positioned in one or a plurality of rows.

Figure 7B:
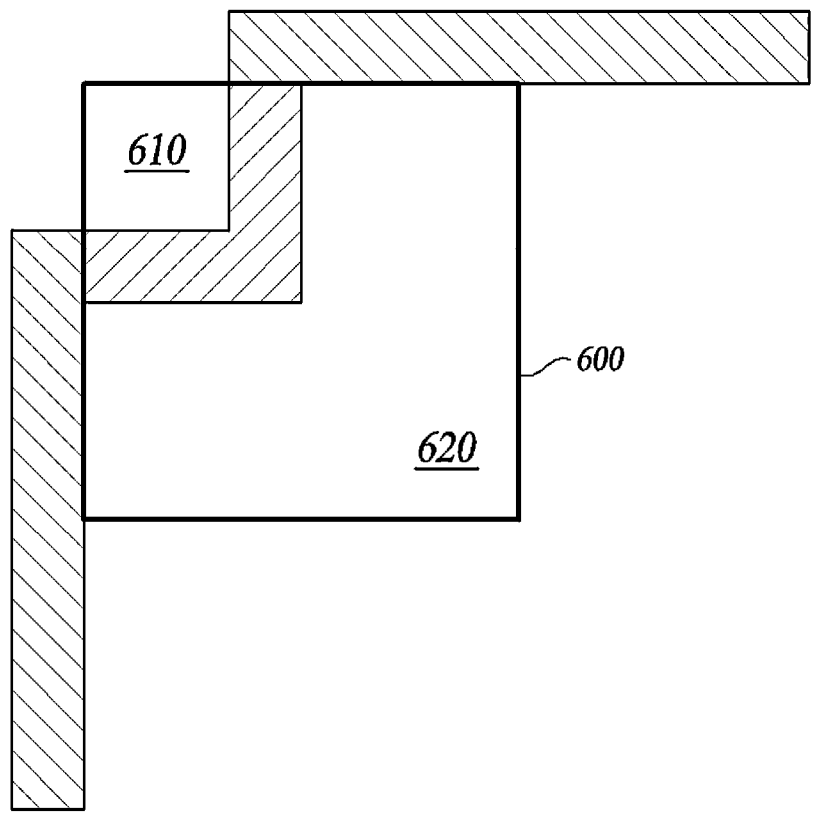
FIG. 7B shows reference samples available for intra-prediction of an L-shaped block in SPLIT_LEFT_UP according to an embodiment of the present disclosure.

Similarly, in the case of SPLIT_LEFT_UP, the rectangular block 610 at the top left may have been already reconstructed before the L-shaped block 620 within the coding block 600 is predicted. In other words, when performing intra-prediction for the L-shaped block 620 within the coding block 600, reconstructed samples of the rectangular block 610 within the coding block 600 may be used as well as reconstructed samples of left and upper blocks contiguous to the coding block 600. Accordingly, the rectangular block 610 may be intra-predicted from reference samples contiguous to the coding block 600, and then the L-shaped block 620 may be intra-predicted from reference samples contiguous to the coding block 600 and reconstructed samples of the rectangular block 610. FIG. 7B shows reference samples available for intra-prediction of the L-shaped block 620 in SPLIT_LEFT_UP.

In the case of SPLIT_RIGHT_UP and SPLIT_LEFT_DOWN, the L-shaped block 620 may be intra-predicted from reference samples contiguous to the coding block 600, and the rectangular block 610 may be intra-predicted from reconstructed samples of the L-shaped block 620, or vice versa.

In another embodiment, a coding block 600 of video data is split into two blocks including a rectangular block 610 and an L-shaped block 620. In this case, before performing intra-prediction for any one (e.g., a block including a [0,0] sample of the coding block 600) of the rectangular block 610 and the L-shaped block 620, the other block may have been already copied through inter-prediction or intra block copy.

In the case of SPLIT_RIGHT_DOWN, for example, the rectangular block 610 positioned at the right bottom corner may have been already reconstructed through inter-prediction or intra block copy before the L-shaped block 620 within the coding block 600 is predicted. In other words, when performing intra-prediction for the L-shaped block 620 within the coding block 600, reconstructed samples of the rectangular block 610 within the coding block 600 may be used as well as reconstructed samples of left and upper blocks contiguous to the coding block 600. Accordingly, the L-shaped block 620 may be intra-predicted from reference samples of neighboring blocks contiguous to the coding block 600 and reconstructed samples of the rectangular block 610 within the coding block 600.

Similarly, in the case of SPLIT_LEFT_UP, the L-shaped block 620 positioned at the right and bottom sides may have been already reconstructed through inter-prediction or intra block copy before the rectangular block 610 within the coding block 600 is predicted. In other words, when performing intra-prediction for the rectangular block 610 within the coding block 600, reconstructed samples of the L-shaped block 620 within the coding block 600 may be used as well as reconstructed samples of left and upper blocks contiguous to the coding block 600. Accordingly, the rectangular block 610 may be intra-predicted from reference samples of neighboring blocks contiguous to the coding block 600 and reconstructed samples of the L-shaped block 620 within the coding block 600.

In this embodiment, the video encoder and the video decoder may be configured to perform bilinear interpolation from reconstructed samples of neighboring blocks contiguous to the coding block 600 and reconstructed samples of the rectangular block 610 within the coding block 600, in order to determine predicted values for the L-shaped block 620 in SPLIT_RIGHT_DOWN. Also, the video encoder and the video decoder may be configured to perform bilinear interpolation from reconstructed samples of neighboring blocks contiguous to the coding block 600 and reconstructed samples of the L-shaped block 620 within the coding block 600, in order to determine predicted values for the rectangular block 610 in SPLIT_LEFT_UP.

Similarly, in the case of SPLIT_RIGHT_UP and SPLIT_LEFT_DOWN, the rectangular block 610 may have been already reconstructed through inter-prediction or intra block copy before the L-shaped block 620 within the coding block 600 is predicted. The L-shaped block 620 may be intra-predicted from reconstructed samples of neighboring blocks contiguous to the coding block 600 and reconstructed samples of the rectangular block 610 within the coding block 600.

Figure 8A:
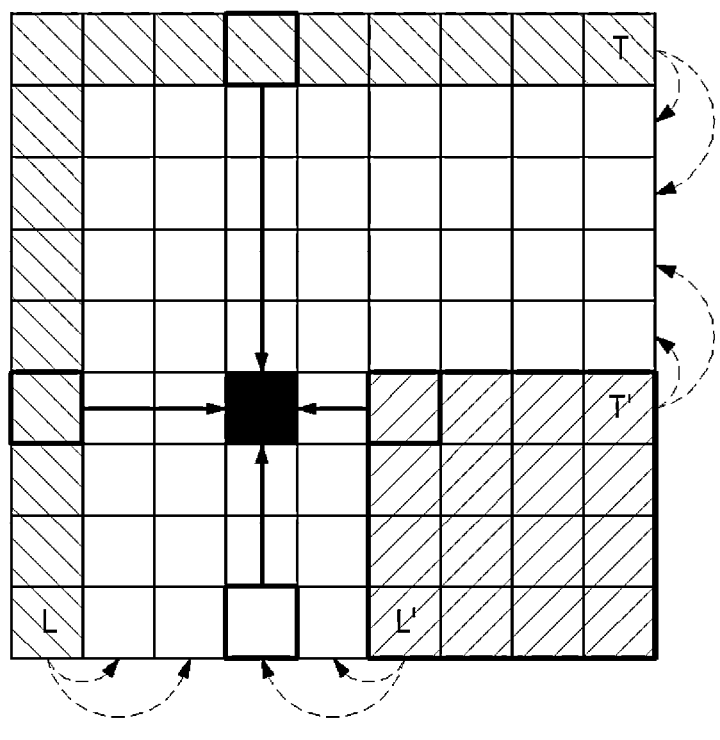
FIG. 8A is a conceptual diagram showing bilinear interpolation performed for an L-shaped block of a coding block in SPLIT_RIGHT_DOWN according to an embodiment of the present disclosure.
Figure 8B:
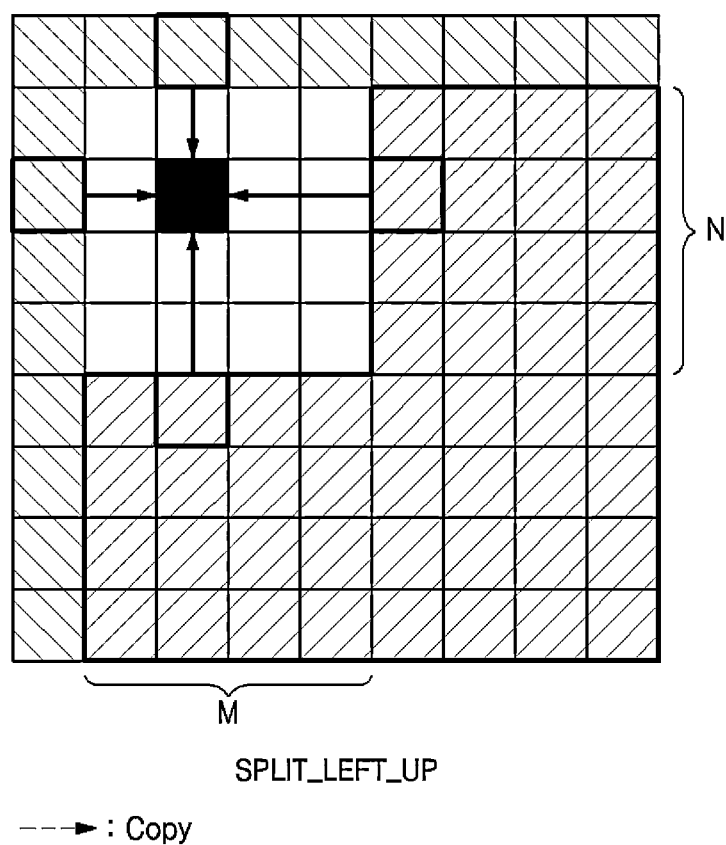
FIG. 8B is a conceptual diagram showing bilinear interpolation performed for a rectangular block of a coding block in SPLIT_LEFT_UP according to an embodiment of the present disclosure.

FIG. 8A is a conceptual diagram showing bilinear interpolation performed for an L-shaped block of a coding block in SPLIT_RIGHT_DOWN. FIG. 8B is a conceptual diagram showing bilinear interpolation performed for a rectangular block of a coding block in SPLIT_LEFT_UP. As illustrated in FIGS. 8A and 8B, the size of the coding block measures 8×8, and the size of the rectangular block measures 4×4.

Referring to FIG. 8A, in SPLIT_RIGHT_DOWN, a prediction value for a given position within the L-shaped block in the coding block may be determined by performing bilinear interpolation by using values of four corresponding boundary samples including (1) a reconstructed value of a boundary sample within a left block contiguous to the coding block, (2) a reconstructed value of a boundary sample within an upper block contiguous to the coding block, (3) a predicted value of a (bottom or right) boundary sample within the L-shaped block in the coding block, and (4) a reconstructed value of a (left or upper) boundary sample within the rectangular block in the coding block. Two of the four corresponding boundary samples are positioned in the same column as a prediction sample of the L-shaped block, and the other two are positioned in the same row as a prediction sample of the L-shaped block.

Here, the prediction value of the bottom boundary sample within the coding block may be copied from a reconstructed value of a boundary sample L within the left block contiguous to the coding block or a left boundary sample L' within the rectangular block, whichever is closer in distance. A predicted value of a right boundary sample within the coding block may be copied from a reconstructed value of a boundary sample T within a block above the coding block or an upper boundary sample T' within the rectangular block in the coding block, whichever is closer in distance. Alternatively, the predicted value of the right boundary sample within the coding block may be generated by linear interpolation of the reconstructed value of the boundary sample L and the reconstructed value of the boundary sample L', and the predicted value of the right boundary sample within the coding block may be generated by linear interpolation of the reconstructed value of the boundary sample T and the reconstructed value of the boundary sample T'.

Referring to FIG. 8B, in SPLIT_LEFT_UP, a prediction value for a given position within the rectangular block in the coding block may be determined by performing bilinear interpolation by using values of four corresponding boundary samples including (1) a reconstructed value of a boundary sample within a left block contiguous to the coding block, (2) a reconstructed value of a boundary sample within an upper block contiguous to the coding block, (3) a reconstructed value of a boundary sample within the L-shaped block contiguous to a lower boundary of the rectangular block in the coding block, and (4) a reconstructed value of a boundary sample within the L-shaped block contiguous to a right boundary of the rectangular block in the coding block. Two of the four corresponding boundary samples are positioned in the same column as a prediction sample of the rectangular block, and the other two are positioned in the same row as a prediction sample of the rectangular block.

Here, instead of reconstructed values of a pair of boundary samples within the L-shaped block, (3-1) a predicted value of a lower boundary sample within the rectangular block and (4-1) a predicted value of a right boundary sample within the rectangular block in the coding block may be used. The predicted value of the lower boundary sample within the rectangular block may be copied from a reconstructed value of a contiguous boundary sample within the L-shaped block, and the predicted value of the right boundary sample within the rectangular block may be copied from a reconstructed value of a contiguous sample within the L-shaped block. The predicted value of the right boundary sample within the rectangular block may be determined as the average of reconstructed values of two contiguous boundary samples within the L-shaped block or may be copied from any one of these reconstructed values.

In the splitting type SPLIT_LEFT_UP, predicted values PredSamples[x][y] for a M×N rectangular block in a W×H coding block may be derived by bilinear interpolation and represented as in Equation 1:

$$\text{PredSamples}[x][y] = (P_v[x][y] + P_H[x][y] + M^*N) \gg (\text{Log}_2(M) + \text{Log}_2(N) + 1)$$
$$P_v[x][y] = ((N-1-y)^*P[x][-1] + (y+1)^*P[x][H-N]) \ll \text{Log}_2(M)$$
$$P_H[x][y] = ((M-1-x)^*P[-1][y] + (x+1)^*P[W-M][y])^,\text{Log}_2(N) \quad \text{[Equation 1]}$$

It should be understood that, in the case of SPLIT_RIGHT_UP and SPLIT_LEFT_DOWN as well, bilinear interpolation may be performed in virtually the same or equivalent manner to SPLIT_RIGHT_DOWN or SPLIT_LEFT_UP.

FIGS. 9A-9D illustrate transform units that can be considered for a coding block for which geometric block splitting is used, according to embodiments of the present disclosure.

Transform or inverse transform of residual signals of the coding block 600 may be performed in transform units of the same size as the coding block 600 regardless of geometric block splitting for prediction of the coding block 600. For example, as in (a) of FIGS. 9A-9D, prediction may be performed for a rectangular block 610 and an L-shaped block 620 into which a coding block 600 of a W×H size is split, and then, as in (b) of FIGS. 9A-9D, transform and inverse transform of a residual block of the coding block 600 may be performed in transform units of a W×H size.

However, prediction accuracy and residual signal characteristics may differ between the two subblocks 610 and 620 in the coding block to which different prediction techniques are respectively applied. Thus, when geometric block splitting is applied to a coding block of video data, it may be more advantageous to perform transform and inverse transform of two residual blocks individually that correspond to two subblocks 610 and 620.

As described above, within the coding block of video data, the L-shaped block 620 and the rectangular block 610 may be encoded and decoded sequentially in a predefined order. In other words, the video decoder may start decoding of the other one after decoding either the L-shaped block 620 or the rectangular block 610. In this case, transform and inverse transform need to be performed for residual blocks individually that correspond to the rectangular block 610 and the L-shaped block 620 into which the coding block is split. In a configuration in which transform and inverse transform are performed for residual blocks individually that correspond to the rectangular block 610 and the L-shaped block 620 into which the coding block is split, further consideration should be given to transform units for the residual blocks of the L-shaped block.

Figure 9A:
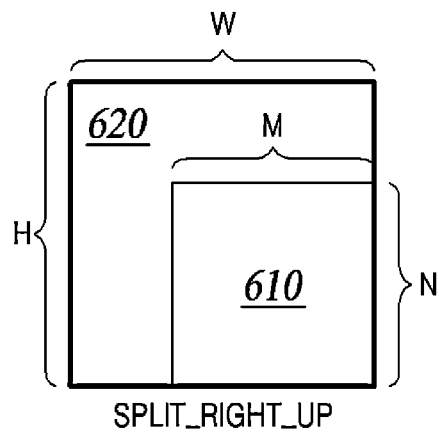
FIGS. 9A-9D illustrate transform units that can be considered for a coding block for which geometric block splitting is used, according to embodiments of the present disclosure.
Figure 9A:
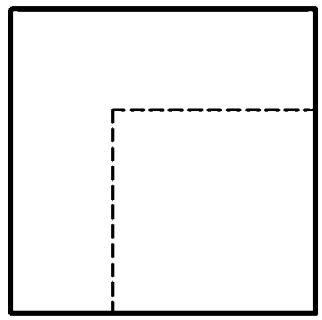
Figure 9A:
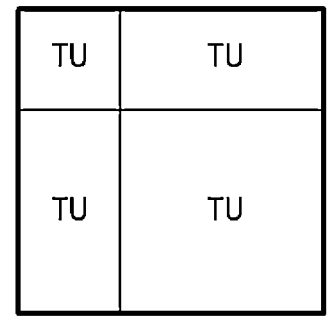
Figure 9A:
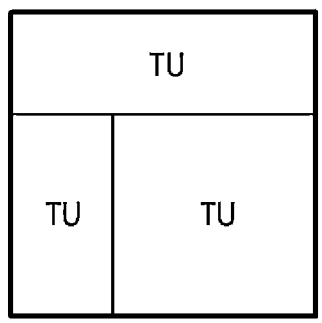
Figure 9A:
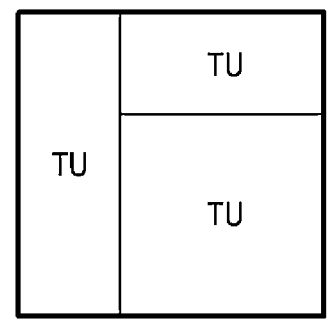
Figure 9B:
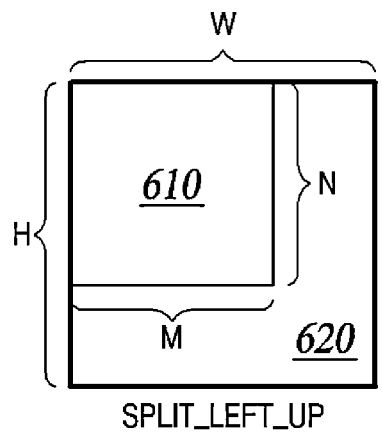
Figure 9B:
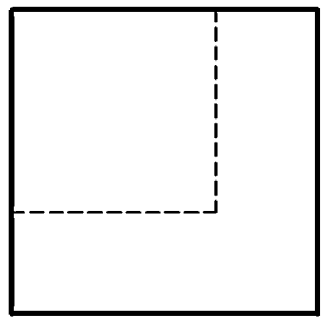
Figure 9B:
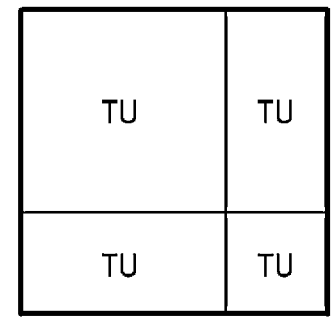
Figure 9B:
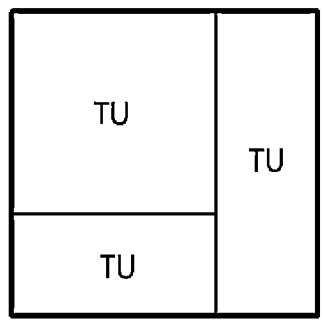
Figure 9B:
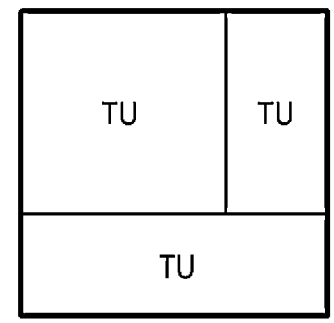
Figure 9C:
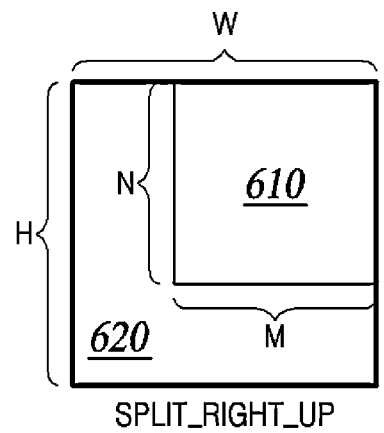
Figure 9C:
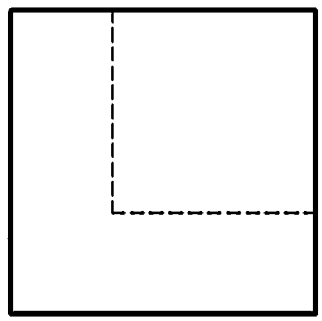
Figure 9C:
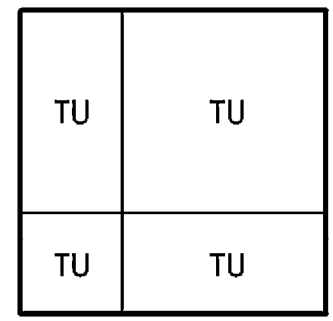
Figure 9C:
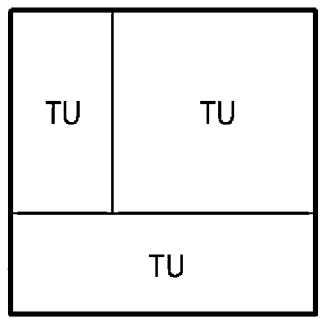
Figure 9C:
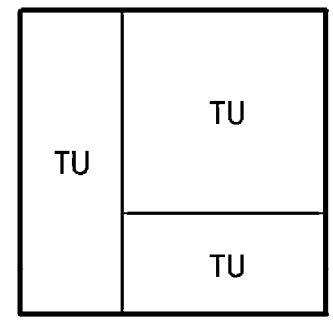
Figure 9D:
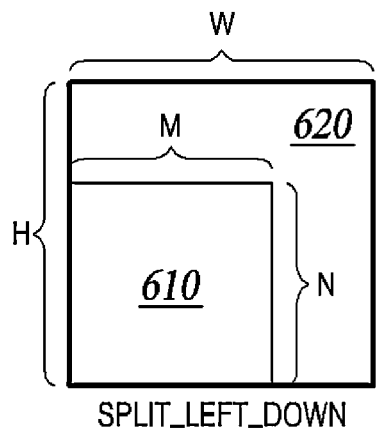
Figure 9D:
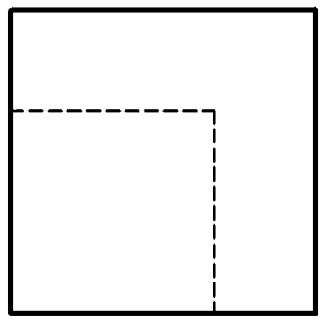
Figure 9D:
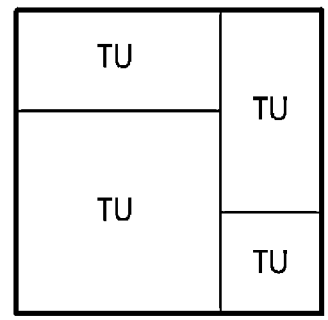
Figure 9D:
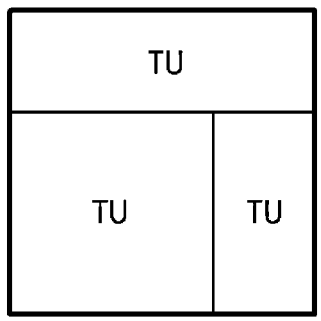
Figure 9D:
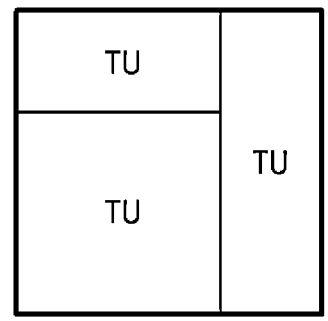

FIG. 9A illustrates transform units that can be considered for a coding block 600 of video data in the case of the splitting type SPLIT_RIGHT_UP in which the coding block is split for prediction into a rectangular block 610 adjoining a bottom right corner and an L-shaped block 620. Here, the size of the coding block measures W×H, and the size of the rectangular block measures M×N. The L-shaped block 620 is composed of samples positioned in "H−N" columns starting from the top of the coding block 600 and samples positioned in "W−M" rows starting from the left side of the coding block 600.

In an embodiment, as shown in (c) of FIG. 9A, for transforming a residual block corresponding to the L-shaped block 620 within the coding block 600, three transform units may be used, including a first transform unit of a width (W−M) and a height (N), a second transform unit of a width (M) and a height (H−W), and a third transform unit of a width (W-M) and a height (H−W). In another embodiment, as shown in (d) of FIG. 9A, for transforming a residual block corresponding to the L-shaped block 620 within the coding block 600, two transform units may be used, including a first transform unit of a width (M) and a height (H−W) and a second transform unit of a width (W−M) and a height (H). In yet another embodiment, as shown in (e) of FIG. 9A, for transforming a residual block corresponding to the L-shaped block 620 within the coding block 600, two transform units may be used, including a first transform unit of a width (W−M) and a height (N) and a second transform unit of a width (W) and a height (H−N).

Similarly, in the case of other splitting types, the L-shaped block 620 may be further split into two rectangular regions or three rectangular regions as illustrated in (c), (d), and (e), and two transform units or three transform units may be used for transforming or inversely transforming a residual block corresponding to the L-shaped block 620. The order of transformation (or the order of inverse transformation or the order of reconstruction) of a plurality of transform units of the L-shaped block 620 may be a z-scan order or an inverse z-scan order or an order agreed upon between the video encoder and the video decoder.

Figure 10:
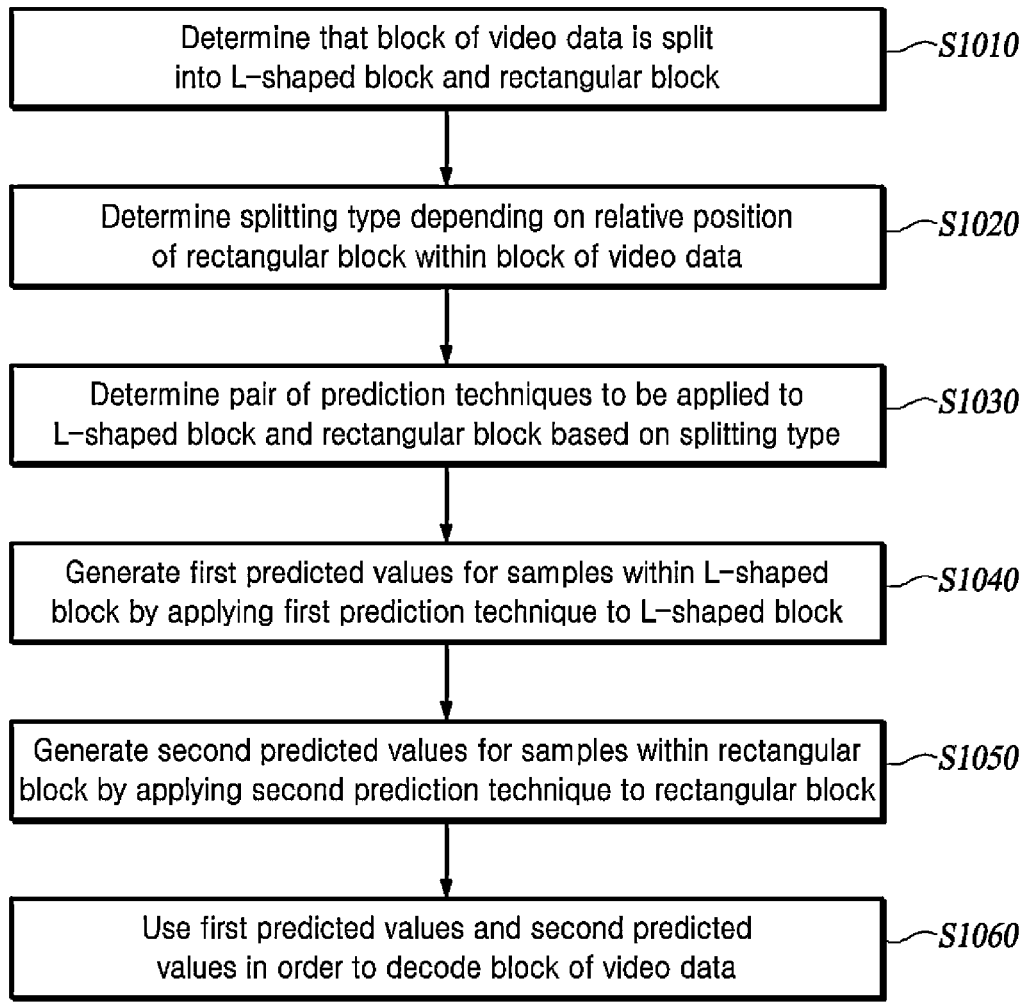
FIG. 10 is a flowchart showing a method of coding a block of video data according to an embodiment of the present disclosure.

FIG. 10 is a flowchart showing a method of coding a block of video data according to an embodiment of the present disclosure. Accordingly, the video encoder may encode a block of video data according to the method illustrated in FIG. 10, and the video decoder may decode a block of video data according to the method illustrated in FIG. 10.

The video encoder and the video decoder each may determine that a block of video data is split into an L-shaped block and a rectangular block (S1010). The video encoder may determine a splitting type to be applied to the block of video data among a plurality of available splitting types (S1020). The available splitting types are distinguished by a relative position of the rectangular block within the block of video data. The video encoder may calculate RD cost and determine whether to encode the block of video data with geometric splitting or without geometric splitting. The video encoder may encode, in a bitstream, a 1-bit flag (e.g., new_split_flag) indicating whether geometric block splitting is applied to the block of video data and an index indicating one of the plurality of splitting types. The video decoder may decode the 1-bit flag and the index from the bitstream, determine whether the block of video data is split into an L-shaped block and a rectangular block based on 1-bit flag (S1010), and determine the splitting type to be applied to the block of video data based on the index (S1020).

The video encoder and the video decoder each may determine a pair of prediction techniques to be applied to the L-shaped block and the rectangular block based on the splitting type for the block of video data (S1030). The pair of prediction techniques include a first prediction technique for the L-shaped block and a second prediction technique for the rectangular block.

The video encoder may select respective prediction techniques appropriate for the L-shaped block and the rectangular block from among available prediction techniques (e.g., intra-prediction, inter-prediction, and intra block copy (IBC)). The video encoder may encode, in a bitstream, syntax elements indicating two prediction techniques to be applied to the rectangular block and the L-shaped block. The video decoder may decode, from a bitstream, syntax elements indicating two prediction techniques to be applied to the rectangular block and the L-shaped block, in order to determine a pair of prediction techniques to be applied to the rectangular block and the L-shaped block.

Alternatively, the pair of prediction techniques may be predefined corresponding to the splitting type. Both of the pair of prediction techniques may be intra-prediction. The pair of prediction techniques may be either inter-prediction or intra block copy and intra-prediction. Here, in a case where the rectangular block adjoins a top left corner of the block of video data, the video encoder and the video decoder may deem (or infer) that the first prediction technique for the L-shaped block is inter-prediction or intra block copy and the second prediction technique for the rectangular block is intra-prediction. In a case where the rectangular block adjoins a bottom right corner of the block of video data, the first prediction technique for the L-shaped block may be inferred as intra-prediction, and the second prediction technique for the rectangular block may be inferred as inter-prediction or intra block copy. In a case where the rectangular block adjoins a bottom left corner or top right corner of the block of video data, the first prediction technique for the L-shaped block may be inferred as inter-prediction or intra block copy, and the second prediction technique for the rectangular block may be inferred as intra-prediction.

The video encoder and the video decoder each may generate first predicted values for samples within the L-shaped block by applying the first prediction technique to the L-shaped block (S1040). The video encoder and the video decoder each may generate second predicted values for samples within the rectangular block by applying the second prediction technique to the rectangular block (S1050).

In an embodiment, in a case where the rectangular block adjoins a top left corner of the block of video data, the first predicted values for samples within the L-shaped block may be intra-predicted by using reconstructed values of samples within a block neighboring the block of video data and reconstructed values of samples within the rectangular block. Accordingly, the rectangular block may be encoded and decoded before the prediction of the L-shaped block. In a case where the rectangular block adjoins a bottom right corner of the block of video data, the second predicted values for samples within the rectangular block may be intra-predicted by using reconstructed values of samples within the L-shaped blocks. Accordingly, the rectangular block may be encoded and decoded before the prediction of the L-shaped block.

In another embodiment, in a case where the rectangular block adjoins a top left corner of the block of video data, the first prediction technique for the L-shaped block may be inferred as inter-prediction or intra block copy, and the second prediction technique for the rectangular block may be inferred as intra-prediction. In this case, the second predicted values for samples within the rectangular block may be intra-predicted by using reconstructed values of samples within a block neighboring the block of video data and reconstructed values of samples within the L-shaped block. Accordingly, the rectangular block may be encoded and decoded before the prediction of the L-shaped block. In a case where the rectangular block adjoins the bottom right corner of the block of video data, the second predicted values for samples within the rectangular block may be intra-predicted by using reconstructed values of samples within the L-shaped blocks. Accordingly, the rectangular block may be encoded and decoded before the prediction of the L-shaped block. In a case where the rectangular block adjoins the bottom right corner of the block of video data, the first prediction technique for the L-shaped block may be inferred as intra-prediction, and the second prediction technique for the rectangular block may be inferred as inter-prediction or intra block copy. In this case, the first predicted values of samples within the L-shaped block may be intra-predicted by using reconstructed values of samples within a block neighboring the block of video data and reconstructed values of samples within the rectangular block. Accordingly, the rectangular block may be encoded and decoded before the prediction of the L-shaped block.

The video encoder may use the first predicted values and the second predicted values in order to encode the L-shaped block and rectangular block of the block of video data, and the video decoder may use the first predicted values and the second predicted values in order to decode the L-shaped block and rectangular block of the block of video data (S1060). As described above, the encoding and decoding orders of the L-shaped block and the rectangular block may differ depending on the splitting type.

The video encoder may generate an array of residual values for the L-shaped block by subtracting the first predicted values from the original values of the samples within the L-shaped block. The video encoder may generate an array of transform coefficients by performing transform of the array of residual values and generate an array of quantized transform coefficients by performing quantization of the array of transform coefficients. The video encoder may entropy-encode the array of quantized transform coefficients for the L-shaped block. The video decoder may entropy-encode the array of quantized transform coefficients for the rectangular block, in a manner equivalent to the L-shaped block.

The video decoder may entropy-decode an array of quantized transform coefficients for the L-shaped block from a bitstream. The video decoder may generate an array of transform coefficients by inversely quantizing the array of quantized transformed coefficients. An array of residual values in a pixel domain may be generated by inversely transforming an array of transform coefficients in a frequency domain. The video decoder may generate a reconstructed block for the L-shaped block by adding first predicted values to the array of residual values for the L-shaped block. The video decoder may generate a reconstructed block for the rectangular block in a manner equivalent to the L-shaped block.

It should be understood that the above-described embodiments can be implemented in many different ways. The functions described in one or more examples may be implemented in hardware, software, firmware, or any combination of the above. The functional components described in this specification have been labeled as units in order to more particularly emphasize their potential independent implementation.

Meanwhile, various methods or functions described in the present disclosure may be implemented with instructions stored in a non-transitory recording medium, which may be read and executed by one or more processors. The non-transitory recording medium includes, for example, all types of recording devices in which data is stored in a form readable by a computer system. For example, the non-transitory recording medium includes storage media such as an erasable and programmable read only memory (EPROM), an electrically erasable and programmable read-only memory (EEPROM), a flash drive, an optical drive, a magnetic hard drive, and a solid state drive (SSD).

Although embodiments have been described for illustrative purposes, those having ordinary skill in the art should appreciate that and various modifications and changes are possible, without departing from the idea and scope of the present disclosure. Embodiments have been described for the sake of brevity and clarity. Accordingly, one of ordinary skill should understand that the scope of the present disclosure is not limited by the embodiments explicitly described above but by the claims and equivalents thereto.

What is claimed is:

1. A method for encoding a block of video data, the method comprising:
   determining that a block of video data is split into an L-shaped block and a rectangular block;
   determining a splitting type depending on a position of the rectangular block among a plurality of corners in the block of video data;
   determining a pair of prediction techniques to be used for predicting the L-shaped block and the rectangular block based on the splitting type for indicating where the rectangular block is located among the plurality of corners in the block of video data, the pair of prediction techniques including a first prediction technique for the L-shaped block and a second prediction technique for the rectangular block;
   generating first predicted values for samples within the L-shaped block by applying the first prediction technique to the L-shaped block; and
   generating second predicted values for samples within the rectangular block by applying the second prediction technique to the rectangular block.

2. The method of claim 1, wherein the pair of prediction techniques are predefined corresponding to the splitting type.

3. The method of claim 1, wherein both of the pair of prediction techniques are intra-prediction.

4. The method of claim 3, wherein,
   in a case where the rectangular block adjoins a top left corner of the block of video data, the first predicted values for samples within the L-shaped block are intra-predicted by using reconstructed values of samples within a block neighboring the block of video data and reconstructed values of samples within the rectangular block, and,
   in a case where the rectangular block adjoins a bottom right corner of the block of video data, the second predicted values for samples within the rectangular block are intra-predicted by using reconstructed values of samples within the L-shaped blocks.

5. The method of claim 1, wherein the pair of prediction techniques are intra-prediction and either inter-prediction or intra block copy.

6. The method of claim 5, wherein, in a case where the rectangular block adjoins a top left corner of the block of video data, the first prediction technique for the L-shaped block is inferred as inter-prediction or intra block copy, and the second prediction technique for the rectangular block is inferred as intra-prediction.

7. The method of claim 6, wherein the second predicted values for samples within the rectangular block are intra-predicted by using reconstructed values of samples within a block neighboring the block of video data and reconstructed values of samples within the L-shaped block.

8. The method of claim 5, wherein, in a case where the rectangular block adjoins a bottom right corner of the block of video data, the first prediction technique for the L-shaped block is inferred as intra-prediction, and the second prediction technique for the rectangular block is inferred as inter-prediction or intra block copy.

9. The method of claim 8, wherein the first predicted values for samples within the L-shaped block are intra-predicted by using reconstructed values of samples within a block neighboring the block of video data and reconstructed values of samples within the rectangular block.

10. The method of claim 1, wherein, in a case where the rectangular block adjoins a bottom left corner or top right corner of the block of video data, the first prediction technique for the L-shaped block is inferred as inter-prediction or intra block copy, and the second prediction technique for the rectangular block is inferred as intra-prediction.

11. A method for decoding a block of video data, the method comprising:
  determining that a block of video data is split into an L-shaped block and a rectangular block;
  determining a splitting type depending on a position of the rectangular block among a plurality of corners in the block of video data;
  determining a pair of prediction techniques to be used for predicting the L-shaped block and the rectangular block based on the splitting type for indicating where the rectangular block is located among the plurality of corners in the block of video data, the pair of prediction techniques including a first prediction technique for the L-shaped block and a second prediction technique for the rectangular block;
  generating first predicted values for samples within the L-shaped block by applying the first prediction technique to the L-shaped block; and
  generating second predicted values for samples within the rectangular block by applying the second prediction technique to the rectangular block.

12. The method of claim 11, wherein the pair of prediction techniques are predefined corresponding to the splitting type.

13. The method of claim 11, wherein both of the pair of prediction techniques are intra-prediction.

14. The method of claim 13, wherein,
  in a case where the rectangular block adjoins a top left corner of the block of video data, the first predicted values for samples within the L-shaped block are intra-predicted by using reconstructed values of samples within a block neighboring the block of video data and reconstructed values of samples within the rectangular block, and
  in a case where the rectangular block adjoins a bottom right corner of the block of video data, the second predicted values for samples within the rectangular block are intra-predicted by using reconstructed values of samples within the L-shaped blocks.

15. The method of claim 11, wherein the pair of prediction techniques are intra-prediction and either inter-prediction or intra block copy.

16. The method of claim 15, wherein, in a case where the rectangular block adjoins a top left corner of the block of video data, the first prediction technique for the L-shaped block is inferred as inter-prediction or intra block copy and the second prediction technique for the rectangular block is inferred as intra-prediction.

17. The method of claim 16, wherein the second predicted values for samples within the rectangular block are intra-predicted by using reconstructed values of samples within a block neighboring the block of video data and reconstructed values of samples within the L-shaped block.

18. The method of claim 15, wherein, in a case where the rectangular block adjoins a bottom right corner of the block of video data, the first prediction technique for the L-shaped block is inferred as intra-prediction and the second prediction technique for the rectangular block is inferred as inter-prediction or intra block copy.

19. The method of claim 18, wherein the first predicted values for samples within the L-shaped block are intra-predicted by using reconstructed values of samples within a block neighboring the block of video data and reconstructed values of samples within the rectangular block.

20. The method of claim 11, wherein, in a case where the rectangular block adjoins a bottom left corner or top right corner of the block of video data, the first prediction technique for the L-shaped block is inferred as inter-prediction or intra block copy and the second prediction technique for the rectangular block is inferred as intra-prediction.

21. A method for providing a video decoding apparatus with video data, the method comprising:
  encoding the video data into a bitstream; and
  transmitting the bitstream to the video decoding apparatus,
  wherein encoding the video data comprises:
    determining that a block of video data is split into an L-shaped block and a rectangular block;
    determining a splitting type depending on a position of the rectangular block among a plurality of corners in the block of video data;
    determining a pair of prediction techniques to be used for predicting the L-shaped block and the rectangular block based on the splitting type for indicating where the rectangular block is located among the plurality of corners in the block of video data, the pair of prediction techniques including a first prediction technique for the L-shaped block and a second prediction technique for the rectangular block;
    generating first predicted values for samples within the L-shaped block by applying the first prediction technique to the L-shaped block; and
    generating second predicted values for samples within the rectangular block by applying the second prediction technique to the rectangular block.

* * * * *